(12) United States Patent
Burkhardt et al.

(10) Patent No.: US 10,254,143 B2
(45) Date of Patent: Apr. 9, 2019

(54) FLUID-FLOW SENSOR ASSEMBLY HAVING REINFORCED BODY

(71) Applicant: Georg Fischer Signet, LLC, El Monte, CA (US)

(72) Inventors: Gert Burkhardt, Pasadena, CA (US); Jorge Samayoa, Los Angeles, CA (US)

(73) Assignee: Georg Fischer Signet LLC, El Monte, CA (US)

( * ) Notice: Subject to any disclaimer, the term of this patent is extended or adjusted under 35 U.S.C. 154(b) by 178 days.

(21) Appl. No.: 15/406,015

(22) Filed: Jan. 13, 2017

(65) Prior Publication Data
US 2018/0202851 A1 Jul. 19, 2018

(51) Int. Cl.
| | |
|---|---|
| F16L 11/11 | (2006.01) |
| G01F 15/14 | (2006.01) |
| G01F 1/66 | (2006.01) |
| G01F 15/18 | (2006.01) |
| F16L 11/115 | (2006.01) |
| G01F 15/00 | (2006.01) |

(52) U.S. Cl.
CPC .............. *G01F 15/14* (2013.01); *G01F 1/662* (2013.01); *G01F 15/18* (2013.01); *F16L 11/115* (2013.01); *G01F 15/00* (2013.01); *G01F 15/185* (2013.01)

(58) Field of Classification Search
CPC ........ F16L 11/11; F16L 11/111; F16L 11/115; F16L 11/15
USPC ................................ 138/139, 121, 129, 172
See application file for complete search history.

(56) References Cited

U.S. PATENT DOCUMENTS

| | | | | | |
|---|---|---|---|---|---|
| 2,582,249 | A | * | 1/1952 | Hendel ................... | F16L 27/11 138/121 |
| 3,332,446 | A | * | 7/1967 | Mann ..................... | F16L 59/125 138/114 |
| 3,490,496 | A | * | 1/1970 | Thornton ................ | F16L 9/18 138/112 |
| 4,130,904 | A | * | 12/1978 | Whalen .................... | A61F 2/06 138/122 |
| 4,236,509 | A | * | 12/1980 | Takahashi ............. | A61B 1/0055 138/122 |
| 4,415,185 | A | * | 11/1983 | Vinciguerra ............ | F16L 11/14 138/120 |
| 4,545,244 | A | | 11/1985 | Yasuda et al. | |
| 4,765,602 | A | * | 8/1988 | Roeseler ............... | B29C 70/085 267/148 |
| 4,966,202 | A | * | 10/1990 | Bryan ..................... | F16L 11/12 138/103 |

(Continued)

FOREIGN PATENT DOCUMENTS

DE      102008013224      9/2009

OTHER PUBLICATIONS

Peters, Marcel "Senflow Flow Meters. NEW, highly accurate, low cost Flow Meter. Inventors of flow technology".

*Primary Examiner* — Patrick F Brinson
(74) *Attorney, Agent, or Firm* — Tsircou Law, P.C.

(57) ABSTRACT

A fluid-flow sensor assembly is provided, comprising a body defining a measuring region for fluid flowing therethrough. A rigid structure is defined about the body to restrict size variation of the body during use. As a result, the rigid structure keeps the measuring section from altering in size, thus ensuring accurate measurement. In an exemplary embodiment, the body defines a ridge assembly that circumscribes the outer wall of the body, and a spiral wrap formed of rigid material is wrapped around the body.

15 Claims, 3 Drawing Sheets

(56) References Cited

U.S. PATENT DOCUMENTS

| | | | |
|---|---|---|---|
| 5,482,089 A * | 1/1996 | Weber | F01N 13/1816 138/103 |
| 5,678,809 A * | 10/1997 | Nakagawa | C04B 35/806 267/148 |
| 5,905,207 A | 5/1999 | Schalk | |
| 6,176,138 B1 | 1/2001 | Barr et al. | |
| 6,234,163 B1 * | 5/2001 | Garrod | F16L 11/20 126/307 R |
| 6,418,769 B1 | 7/2002 | Schreiner | |
| 6,729,181 B2 | 5/2004 | Mayer et al. | |
| 6,830,076 B1 * | 12/2004 | Patel | F16L 31/00 138/110 |
| 7,225,678 B2 | 6/2007 | Kandler et al. | |
| 7,360,450 B2 | 4/2008 | Müller | |
| 7,490,632 B2 * | 2/2009 | Grebe | F02M 35/10137 138/114 |
| 7,954,387 B1 | 6/2011 | Furlong | |
| 7,987,732 B2 | 8/2011 | Konzelmann et al. | |
| 8,523,432 B2 | 9/2013 | Mujumdar et al. | |
| 8,776,593 B2 | 7/2014 | Margalit et al. | |
| 8,955,392 B2 | 2/2015 | Liu et al. | |
| 9,188,259 B2 * | 11/2015 | Fiolek | F02K 1/82 |
| 9,422,953 B2 | 8/2016 | Ehrlich et al. | |
| 10,041,620 B2 * | 8/2018 | Balmer | F01N 13/1816 |
| 2010/0201984 A1 | 8/2010 | Schuda et al. | |
| 2011/0088483 A1 | 4/2011 | Will et al. | |
| 2013/0061686 A1 | 3/2013 | Fujii et al. | |

* cited by examiner

FLUID-FLOW SENSOR ASSEMBLY HAVING REINFORCED BODY

FIELD OF THE INVENTION

The present invention relates generally to sensors and flow meters and, more particularly, to a fluid-flow sensor assembly having a reinforced body.

BACKGROUND OF THE INVENTION

Fluid flow sensors, also known as fluid flow meters or flow meters, are commonly used to measure the flow rate of a given fluid through a given area. This is useful in water and gas lines, in industrial applications such as factories, and so forth. There are many types of fluid flow sensors, which may be suited to different environmental conditions and different types of fluids. Mechanical sensors are common, but, because they contain moving parts, can be expensive to maintain. The cost issue has motivated the growing popularity of other types of sensors for fluid flow measurement, such as magnetic and ultrasonic sensors.

Ultrasonic sensors use ultrasound to measure the velocity of fluid with sound waves. In the most common variety, two ultrasonic transducers are spaced apart in or on a pipe. The transducers send and receive ultrasonic waves between one another. The rate of fluid flow can then be calculated as a function of the difference in travel time of the upstream and downstream waves. These sensors are sensitive to variations in temperature and pressure within the sensor body. Further, factors such as variations in pressure and temperature in the measuring region can alter the diameter or length of the sensor body, which can hinder the accuracy of measurement. This problem is especially prevalent for bodies made from plastic materials, due to the low rigidity and high thermal coefficient of expansion.

Thus, it should be appreciated that there remains a need for a sensor housing that minimizes variations in the size of the sensor body, in order to ensure an accurate measurement. The present invention addresses this need and others.

SUMMARY OF THE INVENTION

Briefly, and in general terms, the invention provides a fluid-flow sensor assembly comprising a body defining a measuring region for fluid flowing therethrough. A rigid structure, e.g., sleeve or wrap, is disposed about the body, and acts to restrict size variation of the body, such as elongation and/or expansion of the body, during use. In various embodiments in accordance with the invention, the body is tubular and formed of thermoplastic resin material.

In an exemplary embodiment, the sensor includes a plastic tubular body that defines a spiral ridge that circumscribes the outer wall of the body. A rigid spiral wrap formed of rigid material, e.g., metal, carbon fiber, etc. is wrapped around the tubular body, which is confined within the plastic spiral ridge of the plastic body. This helps prevent expansion of the body in both diameter and length.

In another exemplary embodiment, a pair of ultrasonic sensors is spaced apart in the body to measure flow rate.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
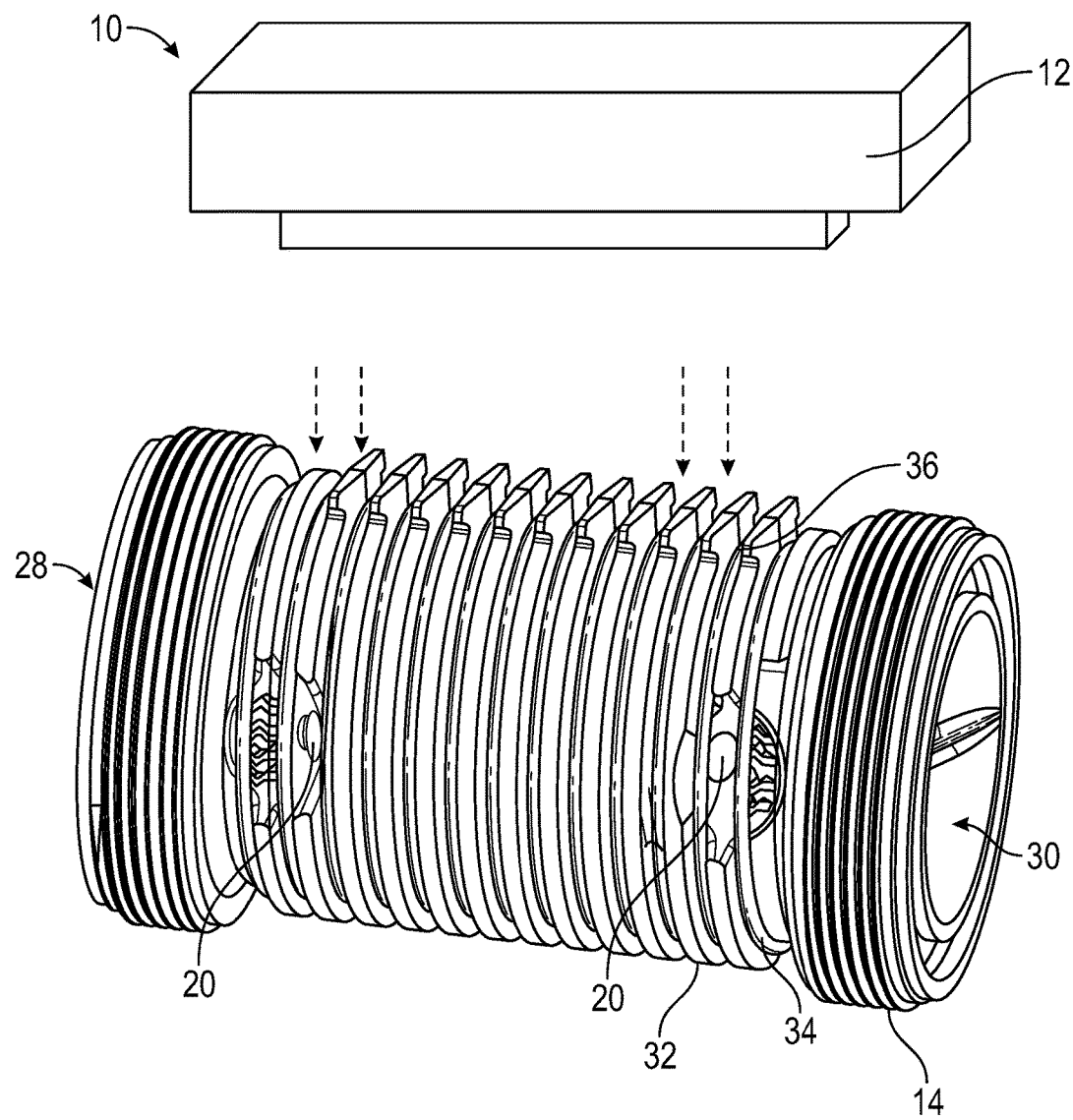
FIG. 1 is a perspective view of a fluid-flow sensor assembly in accordance with the present invention.
Figure 2:
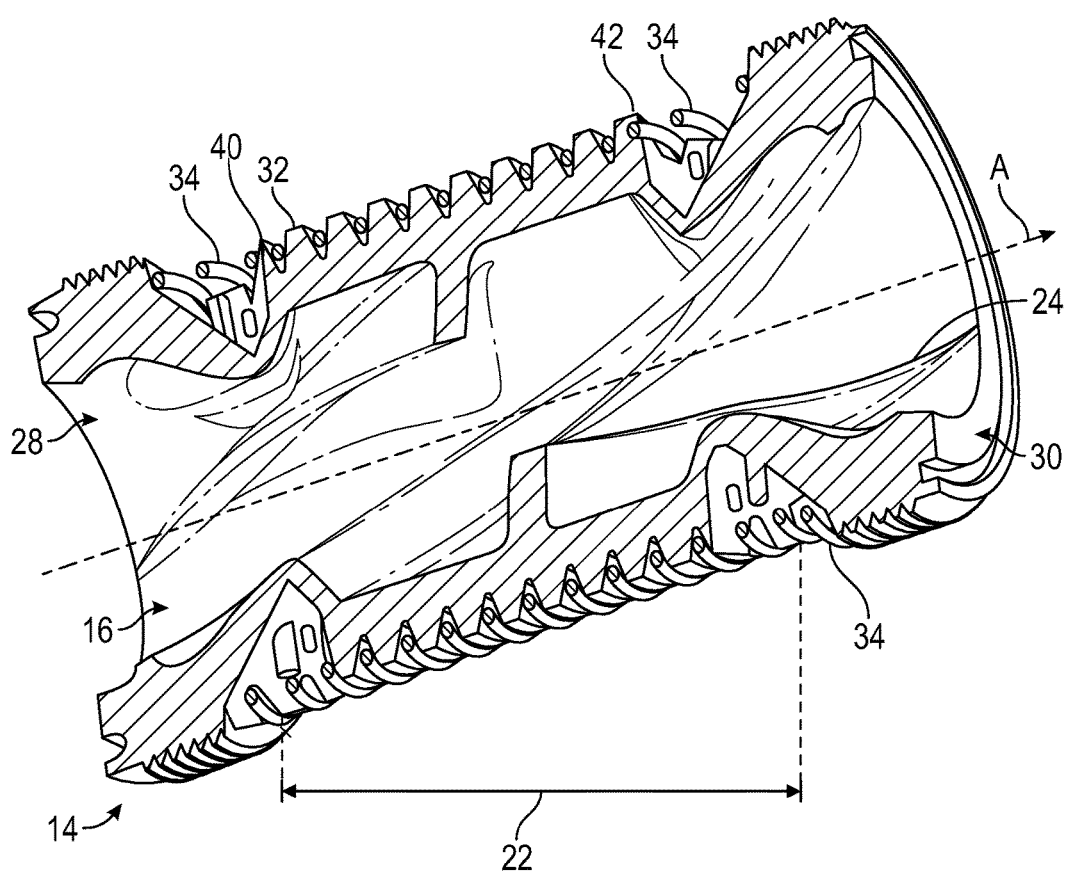
FIG. 2 is a cross-sectional view of the sensor assembly of FIG. 1.

Referring now to the drawings, and particularly FIGS. 1 and 2, there is shown a fluid-flow sensor assembly 10 having an electronics housing 12 mounted to a tubular sensor body 14 disposed about a longitudinal axis (A). The body 14 defines a measurement section 22 for fluid flowing therethrough. The cross-section of this tubular body will often be circular or near circular but other cross-section shapes may be used. The sensor assembly includes a rigid structure 34 disposed about the body 14 to restrict size variations, during use, such as elongation and/or expansion of the body and to inhibit radial expansion of the sensor body, to promote accurate measurements.

In an exemplary embodiment, the sensor body 14 is used with ultrasonic sensors. A pair of ultrasonic sensors is spaced apart in the body 14 to measure flow rate. Variations in the size of the body 14 will affect the reading obtained by these sensors. The sensor assembly 10 is designed to minimize these variations, while in use, for accurate measurements. The sensor body 14 includes opposing ends 28, 30 configured to attach inline to a fluid flow system. The sensor body 14 is configured to maintain its form, to minimize radial variation, despite variations in pressure or temperature, during use.

For many applications it is desirable to manufacture the sensor body 14 from a suitable engineering plastic like PVC or PVDF instead of the commonly used metal bodies, for reasons of cost, reduced weight and better chemical compatibility with the flowing media. However, due to much lower rigidity and much higher temperature coefficient of expansion, such a plastic sensor body may incur unacceptable accuracy loss with temperature and pressure changes. Expansion of an ultrasonic device in radial direction relates to negative reading error and is partially compensated by expansion in axial direction which leads to positive reading error. However, since the effects of the radial expansion are predominant, a purpose of the invention is to inhibit radial and axial variations.

The sensor body 14 is formed of a unity construction, having a ridge assembly 32 projecting from its exterior wall proximate to the opposing ends 28, 30. The ridge assembly 32 aids in structural stability of the sensor body during use, predominantly in radial direction, aiding in measurement accuracy. The ridge assembly also serves to further manufacturability by injection molding, reducing the process time.

With continued reference to FIG. 2, the rigid structure 34 circumscribes the sensor body 14 extending across the measurement section 22 thereof. The rigid structure 34 is confined by the ridge assembly 32 of the sensor body 14. The rigid structure 34 includes a first end 40 proximate to the first end 28 of the sensor body and a second end 42, proximate to the second end 30 of the sensor body. The rigid structure 34 is defined about the body 14 to restrict size variation, such as, axial variation the body 14 and to further reduce radial expansion of the body 14. The rigid structure 34 is disposed in recesses defined by the ridge assembly 32. As a result, the rigid structure 34 keeps the measurement section 22 from altering in size due to pressure or temperature variations. The rigid structure 34 should be made of a rigid material such as steel wire, glass or carbon fiber wrap. In the exemplary embodiment, the rigid structure 34 is configured as a metal spring confined within the recess is formed by the ridge assembly 32. An alternative version of such rigid structure can be a wrap of resin-impregnated glass fiber or carbon fiber strands in the grooves between the ridges.

Figure 3:
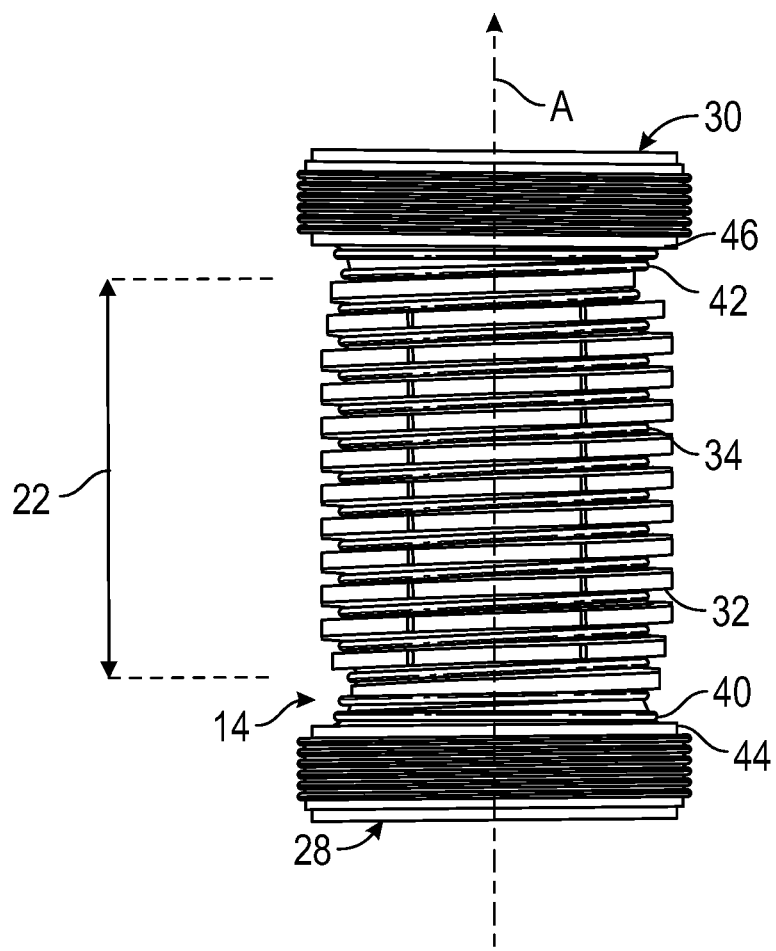
FIG. 3 is a top view of the sensor assembly of FIG. 1.

As best seen in FIG. 3, the ridge assembly 32 is configured as a single helical ridge that projects from the body and that circumscribes the body 14 spiraling thereabout from proximate to the first end 30 and to the second end 42, across the measurement section 22, defining a corresponding recess that is sized to receive snuggly the rigid structure across a measurement section 22 of the sensor body.

With continued reference to FIG. 3, the ends 40, 42 of the rigid structure 34 abuts adjacent portions of the sensor body 14. More particularly, the end 40 abuts circumscribing wall 44 of the treaded attachment end 28; and the end 42 abuts circumscribing wall 46 of the treaded attachment end 30. In this manner, the rigid structure restricts longitudinal variation of the sensor body. Moreover, the ridge assembly is configured to provide a tight fit for the rigid structure therein, which aids in restricting radial and longitudinal variations of the sensor body.

In other embodiments, the ridge assembly may include other configurations, e.g., such as a plurality number of separate ring-shaped ridges spaced apart between the first end and the second end. The ridge(s) of the ridge assembly can provide apertures to enable an elongated rigid structure (e.g., 34) to extend from its first end to the its second across the sensor body.

In the exemplary embodiment, the sensor body 14 is formed of a desired composition of thermoplastic material, preferably a commonly used piping system plastic like PVC, CPVD, PVDF, PP, PE or ABS. Other materials are feasible as well.

With reference again to FIG. 1, the sensor body 14 provides mount 36 for securing the electronics housing thereto. In this embodiment, the mount is formed by projections of the ridge assembly 32.

It should be appreciated from the foregoing that the present invention provides a reinforced sensor body that minimizes variations in the size of the sensor body due to pressure, temperature, and other factors.

The present invention has been described above in terms of presently preferred embodiments so that an understanding of the present invention can be conveyed. However, there are other embodiments not specifically described herein for which the present invention is applicable. Therefore, the present invention should not to be seen as limited to the forms shown, which is to be considered illustrative rather than restrictive.

What is claimed is:

1. A fluid-flow sensor assembly, comprising:
   a sensor body having opposing open ends configured to attach inline to a fluid flow system, the body defining an interior measurement section therein disposed about a longitudinal axis, the measurement section defining a channel for enabling fluid flow therethrough, the body having an outer wall and a ridge assembly circumscribing said outer wall, the ridge assembly extends across the measurement section of the body; and
   a rigid structure circumscribing the sensor body and extending across the measurement section of the body; said rigid structure is conformably mounted about the sensor body in such a manner to restrict size variation of the sensor body during use, to include inhibiting radial and axial variation of the sensor body about the measurement section.

2. The sensor assembly of claim 1, wherein the body is formed of thermoplastic.

3. The sensor assembly of claim 1, wherein the rigid structure is a rigid spiral wrap confined by the ridge assembly of the body.

4. The sensor assembly of claim 3, wherein the body is composed of plastic and the spiral wrap is composed of metal.

5. The sensor assembly of claim 1, wherein the rigid structure is formed of a spiral wrap composed of carbon fiber or glass fiber with a resin matrix.

6. A fluid-flow sensor assembly, comprising:
   a sensor body having a tubular shape defining a longitudinal axis and having opposing open ends configured to attach inline to a fluid flow system, the opposing ends defining a first and second end of the body, the body formed of unitary construction of thermoplastic material, the body defining an interior measurement section therein disposed about the longitudinal axis, the measurement section defining a channel for enabling fluid flow therethrough, the body having an outer wall and a ridge assembly circumscribing said outer wall, the ridge assembly extends across the measurement section of the body; and
   a rigid structure circumscribing the sensor body across the measurement section of the body, the rigid structure is confined to recesses formed by the ridge assembly in such a manner that the rigid structure restricts size variation of the body of the sensor body, during use, to include inhibiting radial and axial variation of the sensor body about the measurement section.

7. The sensor assembly of claim 6, wherein the rigid structure is wrapped about the sensor body in a spiral manner, extended across the measurement section thereof.

8. The sensor assembly of claim 6, wherein the ridge assembly is configured as a single helical ridge that projects from the body and that circumscribes the sensor body spiraling thereabout from proximate to the first end and to the second end, across the measurement section.

9. The sensor assembly of claim 8, wherein the rigid structure includes a first end proximate to the first end of the sensor body and a second end proximate to the second end of the sensor body.

10. The sensor assembly of claim 9, wherein the first and the second ends of the rigid structure abuts corresponding circumscribing walls of the sensor body.

11. A fluid-flow sensor assembly, comprising:
a sensor body having tubular shape defining a longitudinal axis and opposing open ends for enabling fluid flow therethrough, the body defining an interior measurement section therein disposed about the longitudinal axis, the body having an outer wall and a ridge assembly circumscribing said outer wall, the ridge assembly extends across the measurement section of the body, the ridge assembly is configured as a helical ridge that projects from the body and that circumscribes the sensor body spiraling thereabout from proximate to the first end and to the second end, across the measurement section, the sensor body is formed of unitary construction of thermoplastic material, the ridge assembly having projections that provide the sensor body with a mount for securing an electronics housing thereto; and
a rigid structure circumscribing the sensor body across the measurement section of the body, the rigid structure is confined to recesses formed by the ridge assembly, the rigid structure is wrapped about the sensor body in a spiral manner, extended across the measurement section thereof, the rigid structure interfaces with the sensor body such that the rigid structure restricts size variation of the sensor body, during use.

12. The sensor assembly of claim 11, wherein the rigid structure includes a first end proximate to the first end of the sensor body and a second end proximate to the second end of the sensor body, the first and the second ends of the rigid structure abuts corresponding circumscribing walls of the sensor body.

13. The sensor assembly of claim 11, wherein the rigid structure is formed of metal.

14. The sensor assembly of claim 11, wherein the rigid structure is formed of carbon fiber or glass fiber with a resin matrix.

15. The sensor assembly of claim 11, wherein the ridge assembly is configured to provide a tight fit for the rigid structure therein such that thermal expansion of the sensor body is restricted.

* * * * *